(12) United States Patent
Shiner et al.

(10) Patent No.: US 11,162,280 B2
(45) Date of Patent: *Nov. 2, 2021

(54) DOOR LOCK/CAMERA APPARATUS, SYSTEM AND METHOD

(71) Applicants: Timothy Shiner, Westlake, TX (US); Harley Schild, Roanoke, TX (US)

(72) Inventors: Timothy Shiner, Westlake, TX (US); Harley Schild, Roanoke, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,377

(22) Filed: Mar. 21, 2019

(65) Prior Publication Data

US 2019/0218825 A1 Jul. 18, 2019

Related U.S. Application Data

(63) Continuation of application No. 15/649,143, filed on Jul. 13, 2017, now Pat. No. 10,294,694.

(60) Provisional application No. 62/480,984, filed on Apr. 3, 2017.

(51) Int. Cl.
| | |
|---|---|
| H04N 7/18 | (2006.01) |
| H04M 11/02 | (2006.01) |
| E05B 47/00 | (2006.01) |
| G07C 9/00 | (2020.01) |
| H04N 21/414 | (2011.01) |
| G08B 13/196 | (2006.01) |
| H04L 12/28 | (2006.01) |
| G08B 3/10 | (2006.01) |

(52) U.S. Cl.
CPC ...... *E05B 47/0012* (2013.01); *G07C 9/00309* (2013.01); *G08B 3/10* (2013.01); *G08B 13/19684* (2013.01); *G08B 13/19695* (2013.01); *H04L 12/2803* (2013.01); *H04N 7/186* (2013.01); *H04N 21/41407* (2013.01); *G07C 2009/00793* (2013.01); *H04L 2012/2849* (2013.01)

(58) Field of Classification Search
None
See application file for complete search history.

(56) References Cited

U.S. PATENT DOCUMENTS

| | | | | |
|---|---|---|---|---|
| 10,294,694 B2 * | 5/2019 | Shiner | ............... | E05B 47/0012 |
| 2007/0103542 A1 * | 5/2007 | Carter | ............... | H04N 7/142 |
| | | | | 348/14.06 |
| 2015/0022620 A1 * | 1/2015 | Siminoff | ............ | H04M 11/025 |
| | | | | 348/14.02 |
| 2016/0330413 A1 * | 11/2016 | Scalisi | ............... | H04N 7/186 |
| 2017/0263067 A1 * | 9/2017 | Scalisi | ............... | G07C 9/00174 |

* cited by examiner

*Primary Examiner* — Quoc D Tran

(57) ABSTRACT

Various embodiments of an integrated wireless door lock and camera are disclosed. A wireless door lock comprises a camera that is activated upon the occurrence of certain events, such as when a person approaches a door where the integrated wireless door lock and camera are installed or when a doorbell is pressed. When activated, the camera sends video or still images to a networked user device for viewing an area outside, proximate to the door. If the person in the viewable area is recognized, a wireless signal may be sent to the integrated wireless door lock and camera to unlock the door.

16 Claims, 7 Drawing Sheets

DOOR LOCK/CAMERA APPARATUS, SYSTEM AND METHOD

CROSS REFERENCE TO RELATED APPLICATION

The present application is a continuation of U.S. patent application Ser. No. 15/649,143, filed on Jul. 13, 2017, which claims the benefit of provisional application No. 62/480,984, filed on Apr. 3, 2017, both of which are hereby expressly incorporated by reference herein.

BACKGROUND

Field of Use

The present application relates to the home security and home monitoring industry. More specifically, the present application relates to electronic door locks and cameras.

Description of the Related Art

Doorbell cameras have become very popular in recent years. These devices typically comprise a housing that contains a pushbutton, a digital camera and wireless transmission circuitry that begins transmitting digital images or video from the camera upon activation by the pushbutton.

Electronic door locks are also becoming quite popular. These locks typically comprise a Wi-Fi receiver and a locking mechanism that locks or unlocks a door based on signals received by the Wi-Fi receiver.

While each of the items above provide convenience for homeowners, the cost of each one is typically over $150, and often $200, making the cost of having both relatively expensive.

SUMMARY

The embodiments described herein relate to apparatus, systems and methods related to an integrated wireless door lock and camera apparatus. In one embodiment, and apparatus is described, comprising the camera for providing video or still images of an area in proximity to a door of a residence, a receiver for receiving wireless signals, a electromechanical locking assembly, a memory for storing processor-executable instructions, a transmitter for transmitting the video or still images to a local-area network, and a processor, coupled to the camera, the receiver, the electromechanical locking assembly, the memory and the transmitter for executing the processor-executable instructions that causes the apparatus to receive, by the processor, an activation signal and provide the activation signal to the processor, in response to receiving the activation signal, activate, by the processor, the camera, activate, by the processor, the camera to provide the video or one or more of the still images, and transmit, by the processor via the transmitter, the video or one or more of the still images to the local-area network.

In another embodiment, an integrated wireless door lock and camera apparatus is described, comprising the camera for providing video or still images of an area in proximity to a door of a residence, a microphone for receiving sound pressure waves and for converting the sound pressure waves into electrical signals, a electromechanical locking assembly, a memory for storing processor-executable instructions, a transmitter for transmitting the video or still images to a local-area network, and a processor, coupled to the camera, the microphone, the electromechanical locking assembly, the memory and the transmitter for executing the processor-executable instructions that causes the apparatus to receive, by the processor via the microphone, the electrical signals, determine, by the processor, that the electric signals represent an audible doorbell chime, in response to determining the electric signals represent an audible doorbell chime by the processor, activate the camera to provide the video or one or more of the still images, and transmit, by the processor via the transmitter, the video or one or more of the still images to a local-area network.

In yet another embodiment, a method performed by an integrated wireless door lock and camera apparatus is described, comprising receiving, by a processor, an input signal, determine, by the processor, that the input signal is indicative of a person in proximity to the apparatus, in response to determining that the input signal is indicative of a person in proximity to the apparatus, activating, by the processor, the camera to provide a video or one or more still images, and transmitting, by the processor via a transmitter, the video or one or more of the still images to a local-area network.

BRIEF DESCRIPTION OF THE DRAWINGS

The features, advantages, and objects of the embodiments of the present invention will become more apparent from the detailed description as set forth below, when taken in conjunction with the drawings in which like referenced characters identify correspondingly throughout, and wherein.

DETAILED DESCRIPTION

The present application describes various embodiments of an integrated electronic door lock and digital camera combination. In one embodiment, the camera is dormant until activated by some kind of external activity, such as by activation of a wireless doorbell by a person outside a door. Integration of these two, common consumer electronic devices provides for a lower cost than the two devices would otherwise cost separately. As such, the lower cost may enable sales professionals to offer such an integrated device to customers as an incentive to purchase other home electronic devices and systems, such as security systems, home automation and monitoring systems, etc. Another advantage of combining a wireless door lock with a digital camera is that some of the components that exist in a wireless door lock can be used to support camera functionality. For example, any wireless door lock already comprises a wireless receiver. Thus, a separate receiver generally does not have to be used to support the camera functionality.

Figure 1:
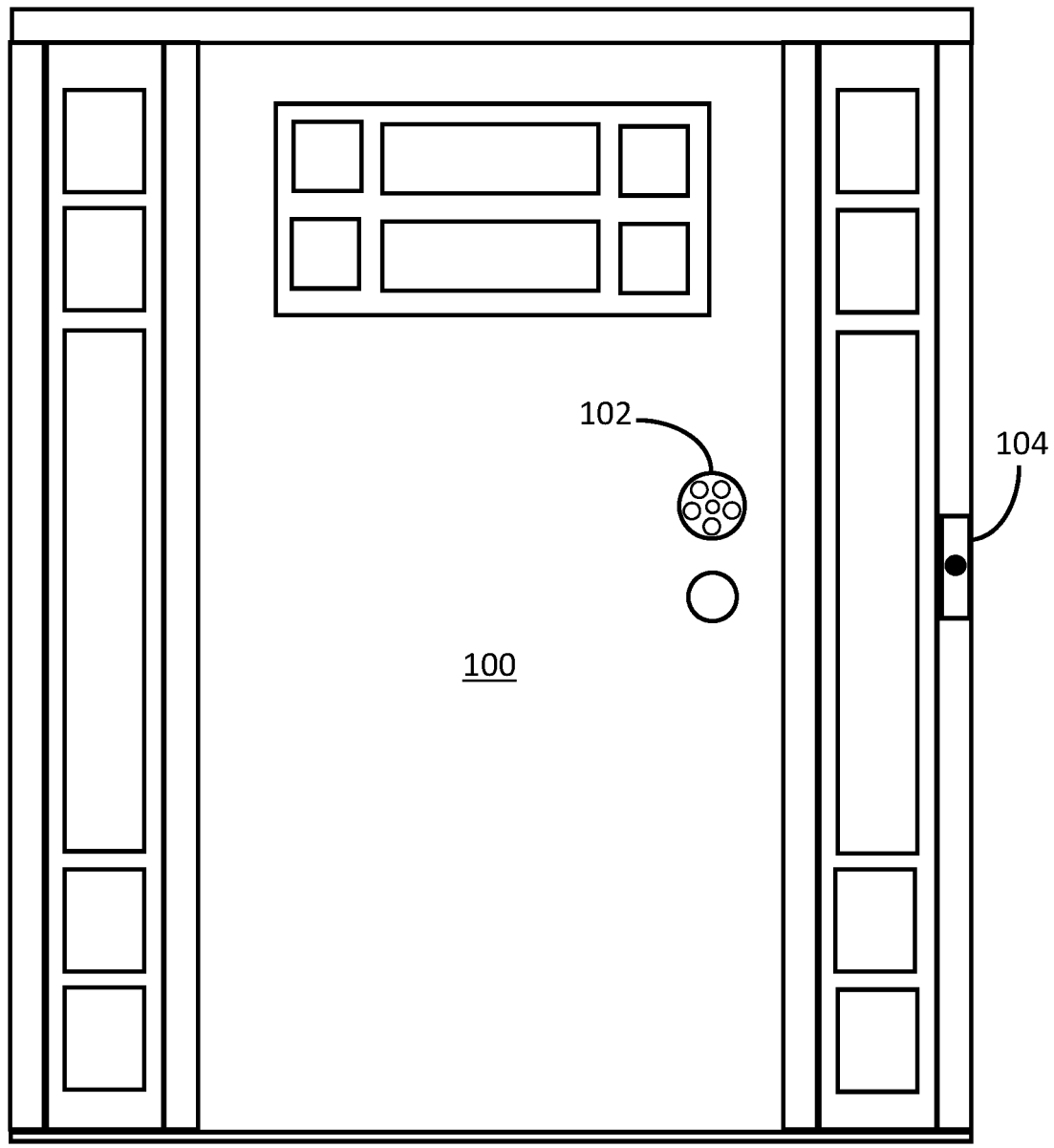
FIG. 1 is an illustration of a door of a residence having an electronic door lock assembly (EDLA) installed thereon, the EDLA comprising a camera.

FIG. 1 is an illustration of a door 100 of a residence having an electronic door lock assembly (EDLA) EDLA 102 installed thereon, EDLA 102 comprising a camera that, in one embodiment, is activated by an activity occurring in proximity to 100. For example, the activity may comprise ringing doorbell 104 or simply a person walking up to door 100. In one embodiment, when doorbell 104 comprises a wireless doorbell and is activated, i.e., pressed by a person standing outside door 100, a wireless signal is transmitted from doorbell 104 to a paired doorbell receiver inside the home which causes an audible notification that someone is outside of door 100. The same wireless signal is received by a receiver disposed inside of EDLA 102. Upon receipt of the wireless signal from doorbell 104, the camera becomes activated, and a transmitter disposed inside EDLA 102 transmits a video stream and/or one or more still images from the camera showing an area outside of door 100. The video stream and/or image(s) may be transmitted to a local-area network, such as a home Wi-Fi network, where it can then be provided to any number of devices, such as computers, smart phones, tablets, etc., for viewing, either inside of the home or remotely. EDLA 102 may then be remotely operated to unlock door 100. With this system, when doorbell 104 is pressed, family members can see who is outside of door 100 before answering, or can remotely unlock the door if they recognize the person ringing the doorbell.

In one embodiment, doorbell 104 comprises a pre-existing, standard, wired doorbell that is hard-wired to a doorbell unit inside a home. In this embodiment, EDLA 102 comprises a microphone, typically located on a surface of EDLA 102 inside the home. When doorbell 104 is pressed, the doorbell unit inside the home creates an audible doorbell notification, typically a familiar, two-tone, "ding dong" sound. The audible notification is received by the microphone, which in turn activates the camera.

In yet another embodiment, where doorbell 104 again comprises a pre-existing, standard, wired doorbell, EDLA 102 does not comprise a microphone, but instead relies on an RF receiver to receive a doorbell notification signal from a transmitter coupled to the doorbell unit. In this embodiment, when doorbell 104 is pressed, the transmitter inside the doorbell unit is triggered, which in turn generates an RF doorbell notification signal that is transmitted to the receiver inside EDLA 102. The RF doorbell notification signal is used to activate the camera.

Figure 2A:
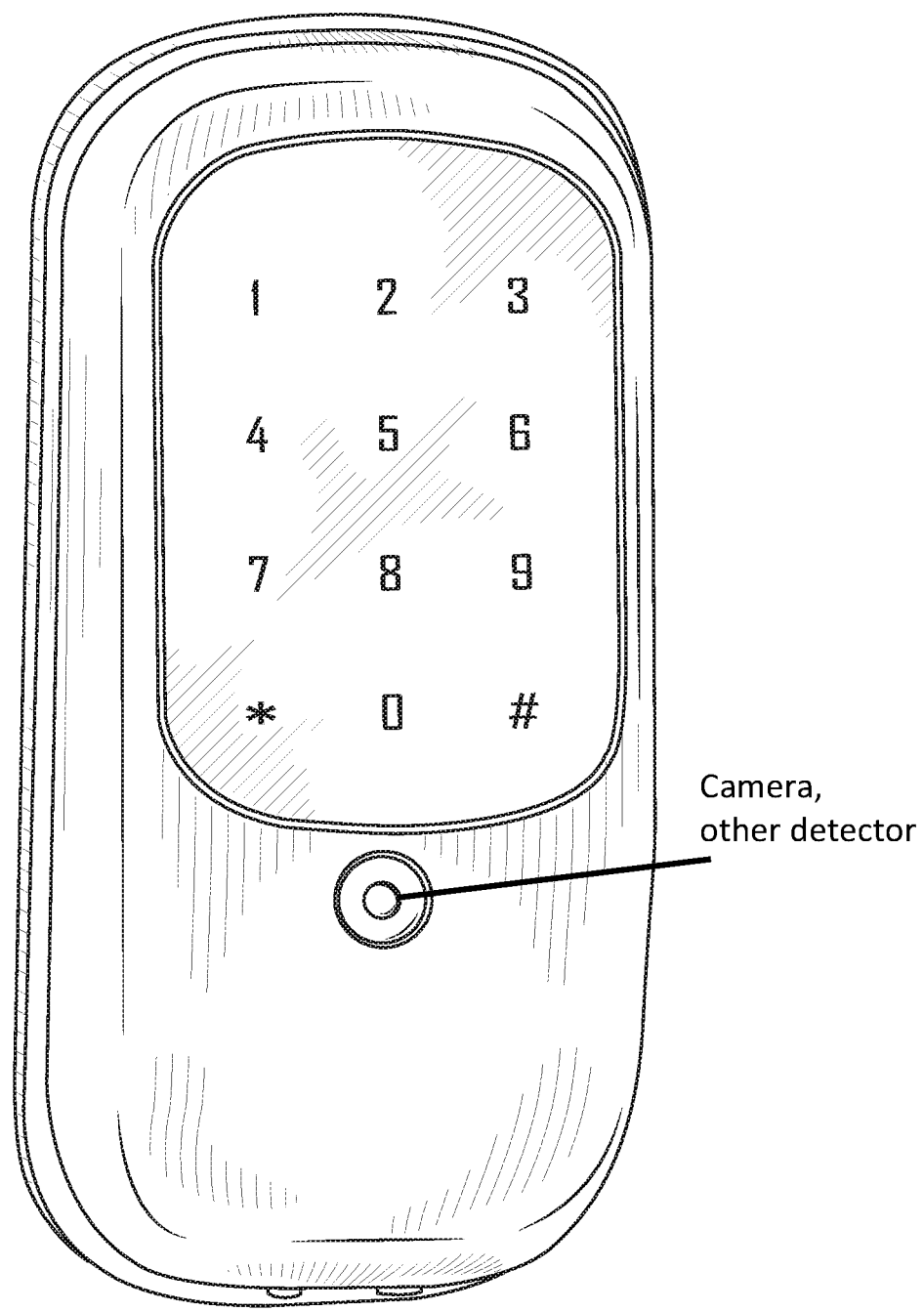
FIG. 2A illustrates a perspective view of one embodiment of an EDLA.
Figure 2B:
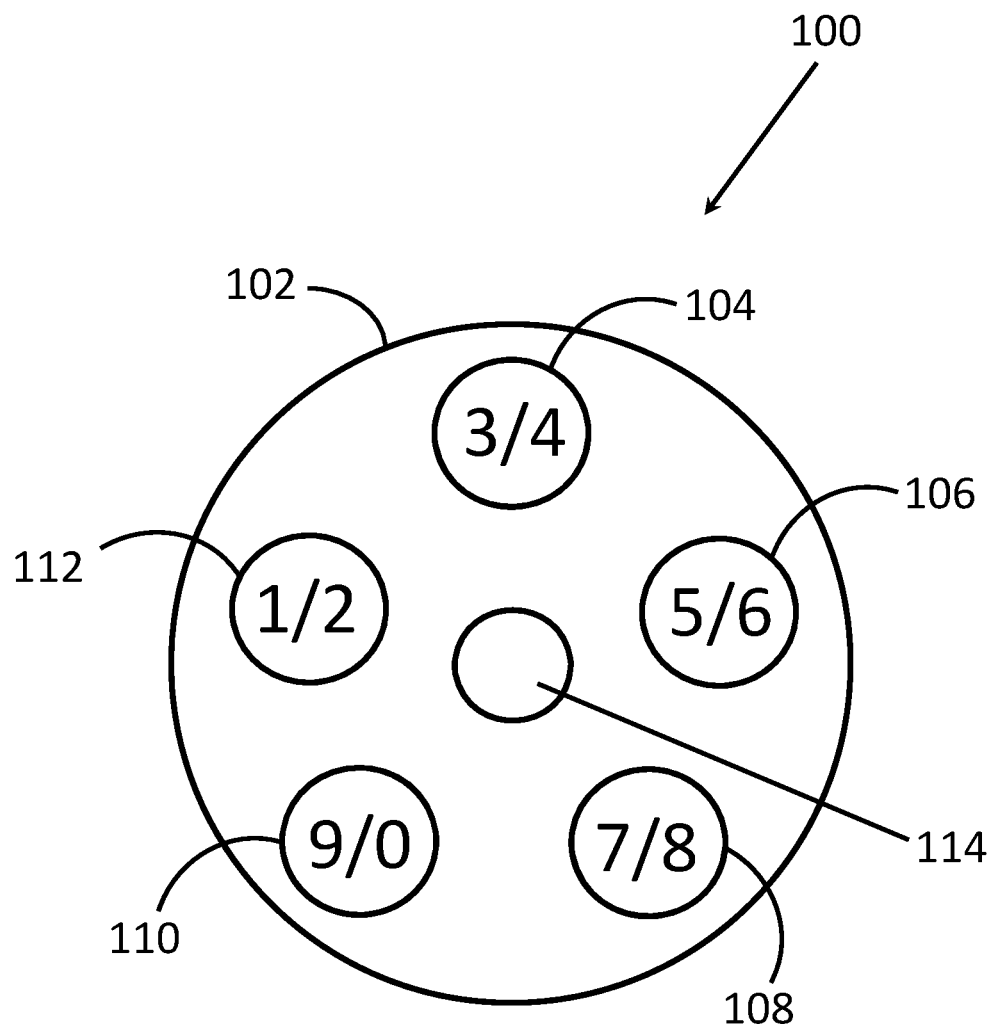
FIG. 2B illustrates a close-up view of another embodiment of an EDLA.

FIG. 2 illustrates a close-up view of one embodiment EDLA 102 as shown in FIG. 1. In this embodiment, EDLA 102 comprises a housing 202, tactile input 204-212, and camera lens 214. The housing EDLA 102 is installed onto a door, just as any other door lock would be. However, inside housing EDLA 102 is a wireless receiver for receiving wireless signals from doorbell 104 and/or from a home local-area network. The housing EDLA 102 additionally comprises a camera inside, coupled to lens 214, in order to obtain video or still images of an area surrounding door 100. Tactile input 204-212 comprises numbers and/or letters and/or other symbols imprinted on either physical pushbuttons or displayed on a digital display to allow manual locking and unlocking of EDLA 102, as well-known in the art. It should be understood that in other embodiments, other physical arrangements are possible without departing from the inventive principles described herein. For example, a greater number of tactile input could be used, or they could be arranged in a different manner, or a keyhole could be used instead of the tactile input. In other embodiments, camera lens 214 could be located in a different area of the housing EDLA 102, for example, at the top of housing EDLA 102.

Figure 3:
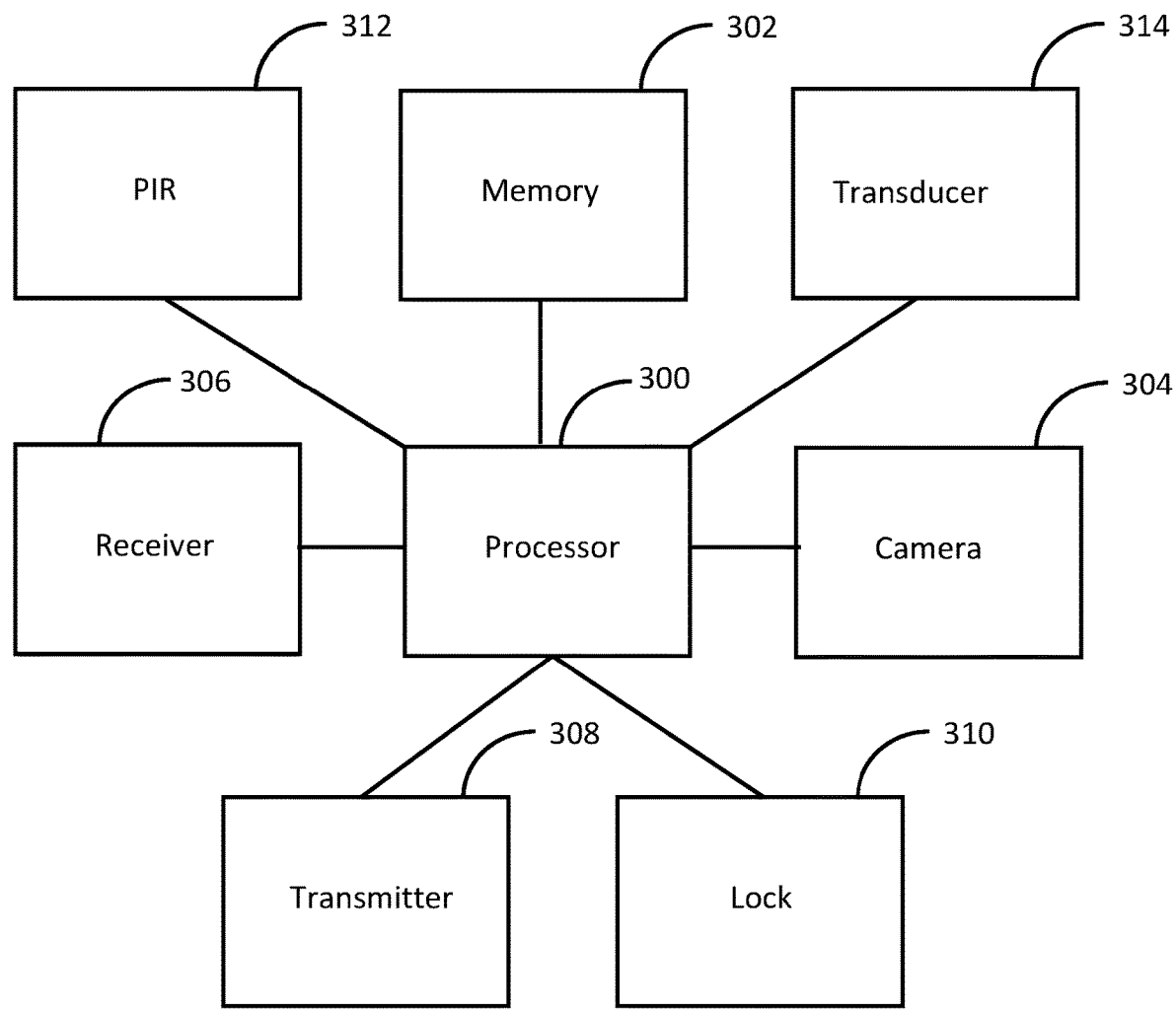
FIG. 3 illustrates a functional block diagram of one embodiment of the EDLA as shown in FIGS. 1, 2A and 2B.

FIG. 3 illustrates a functional block diagram of one embodiment of EDLA 102. Shown is processor 300, memory 302, camera 304, receiver 306, transmitter 308, electromechanical locking assembly 310, optional passive infra-red (PIR) sensor 312 and optional transducer 314. It should be understood that the blocks shown in FIG. 3 could be arranged in different manners in other embodiments. For example, camera 304 could have an integrated transmitter, thus eliminating the need for transmitter 308.

Processor 300 is typically a microprocessor or microcontroller that executes processor-executable code stored in memory 302, for providing general operation of the electronic door lock. Processor 300 is generally selected based on design requirements such as power consumption, computational power, and cost.

Memory 302 comprises one or more information storage devices such as ROM, RAM, Flash, or other type of electronic, optical or mechanical electronic storage mediums, or any combination thereof. Memory 302 is used to store processor-executable instructions for operation of EDLA 102, and, in some embodiments, information used to allow locking and unlocking of door 100 via electromechanical locking assembly 310, such as an alpha-numeric code to lock/unlock door 100, permitted entry times, information for identifying permitted users of EDLA 102, etc. It will also be appreciated that memory 302 may be physically incorporated within the same IC chip as processor 300.

Camera 304 comprises and lens 214 and circuitry for generating digital images or digital video from signals received from camera lens 214. Camera 304 may be integrated with processor 300, or it may comprise a commercially-available OEM package for integration with processor 300, or some other arrangement well-known in the art. In some embodiments, lens 214 comprises a "fish eye" lens, capable of capturing a wide-angle view of an area outside of door 100.

Receiver 306 comprises circuitry necessary to receive wireless signals transmitted from doorbell 104 ("activation signals") and provide them to processor 300. The circuitry may further be capable of receiving wireless signals from a local-area network, such as a home Wi-Fi network, for receiving commands from remote users to activate/deactivate camera 304 and/or to operate electromechanical locking assembly 310 to lock or unlock door 100. Doorbell 104 typically transmits activation signals at consumer-based frequencies, such as between 300 Mhz to 433 Mhz, or 900 Mhz, in accordance with one of many well-known, low power wireless communication standards. In other embodiments, doorbell 104 comprises a transmitter that is specially chosen to operate in conjunction with EDLA 102. For example, doorbell 104 may comprise both a Wi-Fi transmitter for transmitting a signal to a receiver inside a home, causing a doorbell to sound, and a Bluetooth LE transmitter for providing an activation signal to EDLA 102 to activate camera 304. Receiver 306 may operate in a dormant state most of the time and "wake up" periodically to listen for wireless signals from doorbell 104 or for wireless signals from a local-area wireless network, in order to save battery life. The circuitry may support one or more well-known communication protocols, such as Wi-Fi, Bluetooth, Bluetooth Low Energy, RF, Zigbee, Z-wave or some other communication protocol.

Transmitter 308 transmits digital video and/or still images provided by camera 304 to a local-area network, such as a home Wi-Fi router, also known as a gateway or residential gateway. Such circuitry is well known in the art and may comprise Wi-Fi, Bluetooth, Bluetooth Low Energy, RF, Zigbee, Z-wave, among others.

Electromechanical locking assembly 310 comprises an electromechanical mechanism that may be operated locally, i.e., by a person standing outside the door using the tactile input 204-212 and, typically, via wireless signals received from users over the local area network and/or directly from a user's phone. Electromechanical locking assembly 310 generally comprises an electric motor that drives a deadbolt or other latching mechanism into an open or closed position when either a remote command is received or when a user standing outside of the door enters a correct code via tactile input 204-212.

Passive infra-red (PIR) sensor 312 is an optional, well-known infra-red sensor that detects infra-red light radiating from people, and draws minimal power to operate. It is ideally suited for a battery-operated device such as EDLA 102. When PIR 312 detects the presence of a person approaching door 100, a signal is provided to processor 300 which may activate camera 304 in response to receiving the signal. PIR 312 may be used alternatively, or in addition to, receiver 306 for receiving wireless signals from doorbell 104.

Transducer 314 provides for activation of camera 304 in embodiments where an RF signal is not available from doorbell 104, i.e., when doorbell 104 comprises a standard, wired doorbell. In one embodiment, transducer 314 comprises an acoustic transducer, such as a microphone, for converting sound pressure waves (such as the familiar "ding dong" of a doorbell chime, knocking sounds as a person knocks on door 100, etc.) into electrical signals. There are a wide variety of small, low-cost microphones on the market that would be ideally suited to receive sound waves created by an indoor doorbell unit when doorbell 104 is pressed, in embodiments where doorbell 104 comprises a standard, wired doorbell. Such microphones may comprise well-known piezoelectric microphones for example. In another embodiment, transducer 314 comprises a shock and/or vibration sensor to detect shock waves and/or vibrations from door 100 as a person knocks on door 100. Such shock/vibration sensors are widely available on the market and feature low cost and low power consumption. The shock/vibration sensor can provide signals to processor 300 to determine whether a sensed shock and/or vibration is representative of a door knock or some other jostling of door 100.

Figure 4:
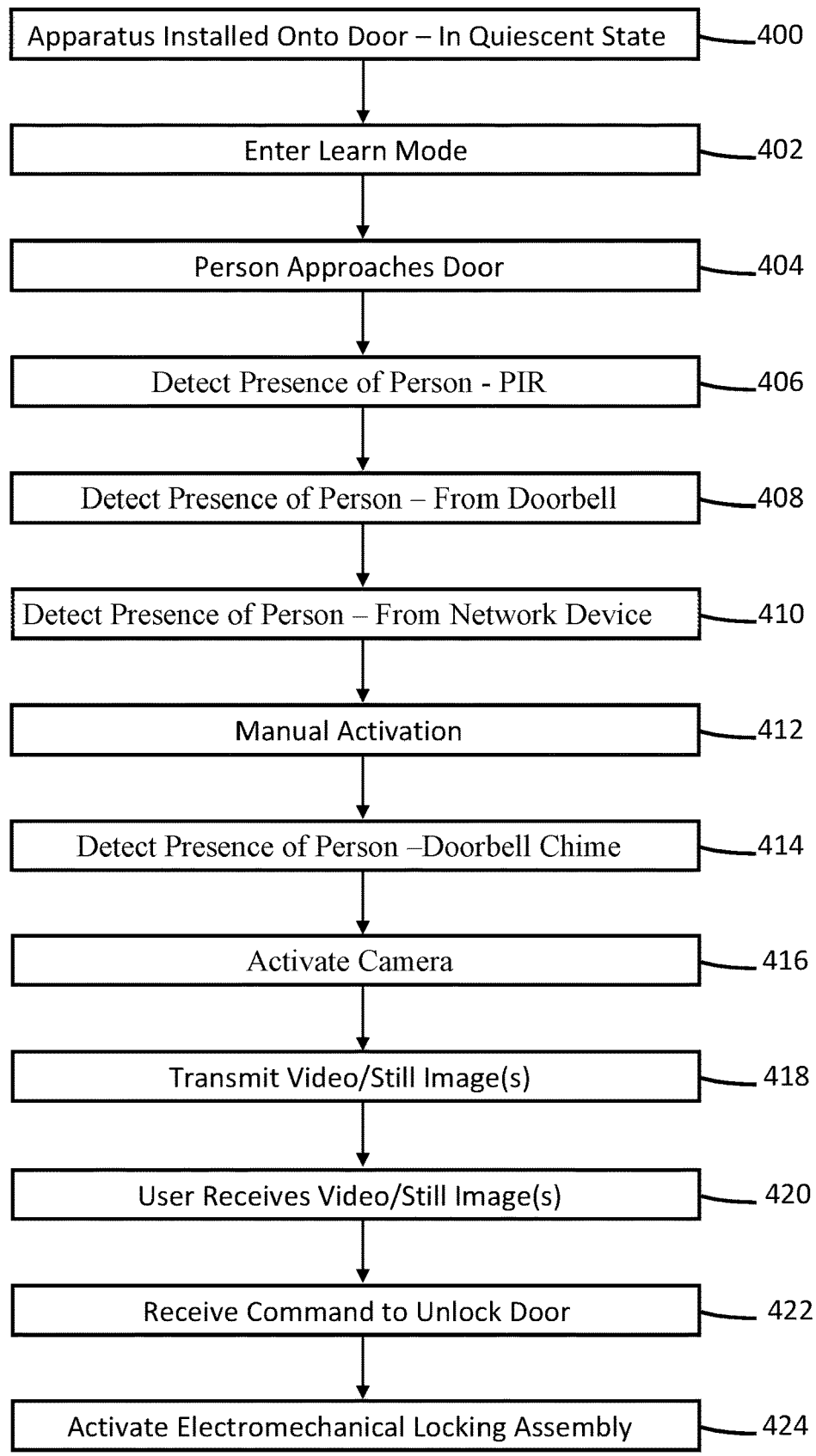
FIG. 4 is a flow diagram illustrating one embodiment of a method performed by an EDLA for providing digital or still images of an area outside of a door upon activation by an activity occurring in an area proximate to the door.

FIG. 4 is a flow diagram illustrating one embodiment of a method performed by EDLA 102 for providing digital or still images of an area outside door 100 upon activation by an activity occurring in an area proximate to door 100. The method is implemented by processor 300 located within EDLA 102, executing processor-executable instructions stored in memory 302. It should be understood that in some embodiments, not all of the steps shown in FIG. 4 are performed and that the order in which the steps are carried out may be different in other embodiments. It should be further understood that some minor method steps have been omitted for purposes of clarity.

At block 400, EDLA 102 is installed into door 100 and is in a dormant or quiescent state, where camera 304 is unpowered or deactivated in order to preserve battery life of EDLA 102. EDLA 102 is coupled to a local-area network inside a home via, in this example, a home Wi-Fi gateway.

In one embodiment, at block 402, EDLA 102 performs a "learn" of wireless signals generated by doorbell 104 in order to identify a doorbell activation signal from doorbell 104. The doorbell activation signal, in one embodiment, comprises a wireless signal generated by a doorbell that activates a doorbell via a doorbell receiver inside a residence. Doorbell 104 may comprise one of a number of doorbells on the market, many having different RF and/or data protocols. Thus, the "learn" allows EDLA 102 to identify an activation signal generated by a particular doorbell.

The learn process begins by a user placing EDLA 102 into a learn mode of operation, either by using one or more of a predetermined sequence of tactile input 204-212, or by wirelessly sending a command to EDLA 102 to enter a learn mode via a networked user device, such as a computer, smart phone, tablet, or other networked consumer device. Once in learn mode, doorbell 104 is pressed at least one time, generating a representative doorbell activation signal in accordance with the particular doorbell installed proximate to door 100. The representative doorbell activation signal is received by processor 300, digitized and stored in memory 302. The learn mode is then exited, either automatically after storage of the doorbell activation signal, or manually via user input via tactile input 204-212 or by a wireless command.

At block 404, a person approaches door 100.

At block 406, in one embodiment, PIR 312 detects the presence of the person as the person approaches door 100, using traditional methods well-known in the art. PIR 312 generates a camera activation signal upon detecting the presence of a person, which is provided to processor 300. The camera activation signal activates or enables camera 304, or otherwise provides video or one or more still images to processor 300 from camera 304.

Figure 5:
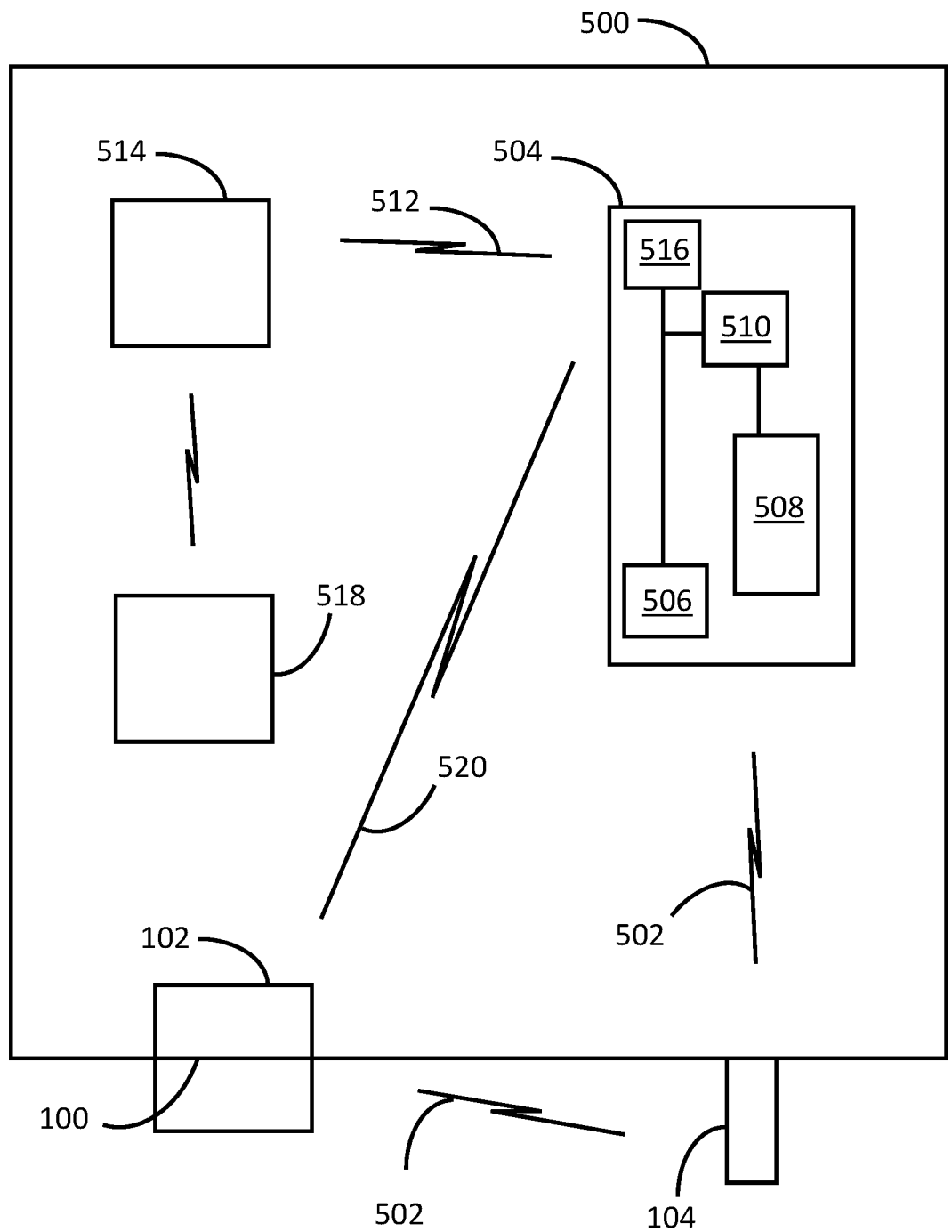
FIG. 5 is a block diagram of a residence having an EDLA installed onto a door of the residence, where EDLA receives activation signals from a doorbell located in proximity to the door.

At block 408, in another embodiment that does not utilize PIR 312 and doorbell 104 comprises a wireless doorbell, the presence of the person is determined by receiving a doorbell activation signal directly from doorbell 104 when the person presses, or activates, doorbell 104. FIG. 5 illustrates this embodiment, showing a block diagram of components in a residence 500 that support this embodiment. In this embodiment, the camera activation signal comprises the doorbell activation signal. Upon activation, doorbell 104 transmits a doorbell activation signal 502 to a paired doorbell receiver unit 504 inside residence 500. The doorbell activation signal 502 is received by a wireless receiver 506 located inside paired doorbell receiver unit 504, causing an electromagnetic doorbell chime 508 to sound. Typically, both wireless receiver 506 and doorbell chime 508 receive power from transformer 510, which converts household AC voltage to a lower voltage, such as 12 VAC. The paired doorbell receiver unit 504 may also cause a notification 512 to be sent over the local-area network via transmitter 516 and residential router/gateway 514, as well as a wide-area network, such as the Internet (not shown), of the presence of a person outside of door 100, as indicated by the doorbell press. The doorbell activation signal 502 may be transmitted at consumer-based frequencies, such as between 300 Mhz to 433 Mhz, 900 Mhz, etc., in accordance with one of many well-known, low power wireless communication standards. The doorbell activation signal 502 transmitted by doorbell 104 is also received by receiver 306, demodulated, and then provided to processor 300. In one embodiment, processor 300 determines whether the doorbell activation signal matches a doorbell activation signal stored in memory 302 from block 402 by comparing the received doorbell activation signal to the one stored in memory 302. If a match if determined, processor 300 considers the doorbell activation signal from doorbell 104 to be a camera activation signal. If not, the doorbell activation signal is ignored.

At block 410, in other embodiment, again referencing FIG. 5, receiver 306 receives a camera activation signal 520 to activate the camera not directly from doorbell 104, but indirectly, from the local-area network, i.e. from a networked user device 518 through router/gateway 514. In this embodiment, when doorbell 104 is activated, doorbell activation signal 502 is transmitted from doorbell 104 to a receiver 506 inside paired doorbell receiver unit 504, either directly, or via the local-area network, which may cause doorbell chime 508 to sound. Transmitter 516 may transmit a notification 512 to router/gateway 514 for transmission to networked user device 518, which comprises a computer, smart phone, tablet, or similar networked consumer device. In any case, when networked user device 518 is notified that a person is approaching/in front of door 100, a camera activation signal may be generated by networked user device 518, either autonomously or via manual user input, and transmitted to receiver 306 via the router/gateway 514 to begin providing video/images from camera 304.

At block 412, in yet still another embodiment, camera 304 may be activated remotely by a user anytime the user desires to view the area just outside of door 100. In this embodiment, receiver 306 receives a camera activation command from a networked user device via router/gateway 514 to activate camera 304, which is sent to processor 300. Processor 300 then activates the camera and causes digital video/images to be transmitted to the user via transmitter 308 and router/gateway 514.

Figure 6:
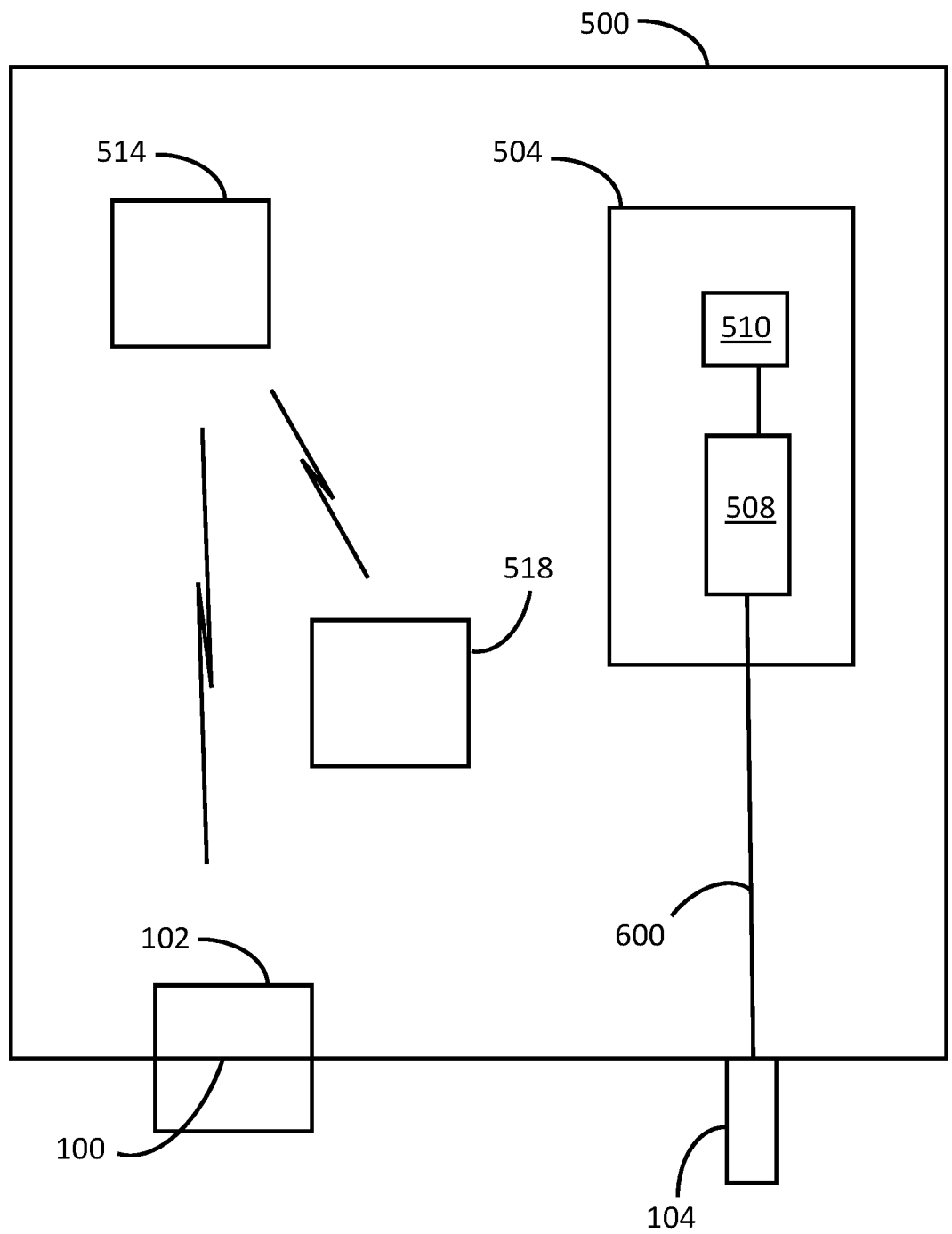
FIG. 6 is a block diagram of a residence having an EDLA installed onto a door of the residence, where EDLA receives activation signals from audible doorbell chimes from a receiver inside the residence.

At block 414, in yet still another embodiment, depicted in FIG. 6 in block diagram format, transducer 314 is used, and comprises a microphone for receiving an audible doorbell chime from doorbell chime 508 when doorbell 104 is activated. In this embodiment, doorbell 104 comprises a standard, wired doorbell having no wireless communication capabilities, hard-wired to paired doorbell receiver unit 504 via conductor 600, such as an insulated wire. When a person rings doorbell 104, a signal is sent via conductor 600 to paired doorbell receiver unit 504 which, in this case, does not possess any wireless communication capabilities. In response to receiving the signal from doorbell 104, chime 508 sounds one or more audible tones, such as the familiar "ding dong" of a standard doorbell. The audible tones are received by transducer 314, which converts the audible tones into electrical signals and provided to processor 300. In some embodiments, the electrical signals from transducer 314 are converted into digital signals, as well-known in the art. Processor 300 receives the signal from transducer 314 and determines whether the signal is indicative of audible tones from doorbell chime 508. This may be accomplished in a number of ways. For example, a filter and/or amplifier could be used to isolate the expected frequency(s) of the audible tone(s) form doorbell chime 508. Then, if any signal is received by processor 300, processor 300 may determine that doorbell chime 508 was activated. In another embodiment, EDLA 102 can enter a learn mode of operation, similar to the learn mode described earlier, where one in learn mode, doorbell 104 is activated, and EDLA 102 records a digital representation of the resulting, representative audible tones from doorbell chime 508 in memory 302. EDLA 102 is then placed into a normal mode of operation, and then processor 300 compares signals received from transducer 314 to the reference tone(s) stored in memory to determine whether a match is present. If so, this indicates that doorbell 104 was activated, and processor 300 activates camera 304 as a result, as explained in the following paragraph. One highly desirable aspect of this embodiment is that EDLA 102 may be used with an existing, hard-wired, standard doorbell.

In another embodiment where transducer 314 comprises a microphone, the presence of a person outside of door 100 may be detected by receiving audible knocking sounds as the person knocks on door 100. In this embodiment, sounds from transducer 314 are provided to processor 300, and processor 300 determines whether the sounds are indicative of a person knocking on a door. This may be accomplished by determining two or more "pulses" of sound at a relatively low frequency, spaced apart from one another by approximately 200-500 milliseconds, or generally a time between when most people knock on doors. Upon detecting that a knocking sound is present, processor 300 activates camera 304 in response.

In yet still another embodiment, transducer 314 is used and comprises a shock and/or vibration sensor used to detect shock waves and/or mechanical vibrations of door 100 as a person knocks on door 100. In this embodiment, mechanical shock and/or vibration signals are received by transducer 314 and converted into electrical signals which are provided to processor 300. Processor 300 then determines whether the signals from transducer 314 are indicative of a person knocking on a door or attempting to open the door by attempting to turn a knob or deadbolt of door 100. This may be accomplished by determining the frequency and magnitude of the shock and/or vibration signals. Memory 302 may store one or more representative samples of shock and/or vibration characteristics expected when someone knocks on a door or otherwise attempts to open a door. In this case, processor 300 may compare the signals from transducer 314 to the one or more representative shock/vibration samples stored in memory 302. If a match is found, processor 300 determines that someone is outside of door 100 and activates camera 304 in response. In another embodiment, one or more samples of shock/vibration can be recorded in memory 302 during a "learn" process, by placing EDLA 102 into a learn mode of operation and then knocking on or jostling door 100 to capture resulting representative shock and/or vibration signals. Processor 300 may use metrics similar to those described earlier with respect to transducer 314 comprising a microphone, looking for shock/vibration signals at relatively large amplitudes from quiescent levels, spaced apart by approximately 200-500 milliseconds, or generally a time between when most people knock on doors.

At block 416, in any of the aforementioned embodiments, in response to receiving the camera activation signal (i.e., the motion signal from PIR 312, the doorbell activation signal, audible tone(s), or one of the other signals discussed above by receiver 306), processor 300 enables or otherwise activates camera 306 and begins receiving digital video or one or more still images from camera 306. The video or still image(s) show an area proximate to door 100, including a face of the person is now standing in front of door 100.

At block 418, processor 300 causes the digital video/image(s) to be transmitted via transmitter 308 to the local-area network via the Wi-Fi gateway and on to end devices, such as one or more of computers, smart phones, tablets, etc. for remote viewing by a homeowner and/or any family members or occupants of the home. Processor 300 may stop transmitting the video/images after a predetermined time period, such as 5 seconds, or it may stop transmitting when a signal is received via receiver 306 from a user, indicating that the user does not wish to continue receiving the video/images.

At block 420, a user inside the home receives the video and/or still image(s) via a networked user device and reviews them to see who is at door 100. In response, the user may send a command, via the networked user device and the Wi-Fi gateway, to unlock door 100.

At block 422, the command to unlock door 100 is received by receiver 306 and provided to processor 300.

At block 424, in response to receiving the unlock command, processor 300 causes electromechanical locking assembly 310 to activate, thus causing a mechanical obstruction, such as a deadbolt, to move into an unlocked position.

While the foregoing disclosure shows illustrative embodiments of the invention, it should be noted that various changes and modifications could be made herein without departing from the scope of the embodiments as defined by the appended claims. Furthermore, although elements of the invention may be described or claimed in the singular, the plural is contemplated unless limitation to the singular is explicitly stated.

We claim:

1. An apparatus, comprising:
   a camera for providing video or still images of an area in proximity to a door of a residence;
   a wireless receiver for receiving wireless signals from a source external to the apparatus;
   an electromechanical locking assembly for unlocking the door;
   a memory for storing processor-executable instructions;
   a transmitter for transmitting the video or still images to a local-area network;
   a microphone;
   a processor, coupled to the camera, the receiver, the electromechanical locking assembly, the memory, the microphone and the transmitter for executing the processor-executable instructions that causes the apparatus to:
      enter a learn mode of operation;
      receive, by the processor via the microphone, an acoustic doorbell chime generated by a doorbell receiver inside the premises;
      store, by the processor, the acoustic doorbell chime in the memory;
      exit the learn mode of operation;
      receive, by the microphone, an acoustic signal;
      determine, by the processor, that the acoustic signal comprises a camera activation signal when the acoustic signal matches the acoustic doorbell chime stored in the memory;
      in response to determining that the acoustic signal comprises the camera activation signal, activate, by the processor, the camera;
      transmit, by the processor via the transmitter, the video or one or more of the still images to the local-area network;
      receive, by the processor via the wireless receiver in response to transmitting the video or one or more of the still images, a command to unlock the door; and
      activate, by the processor in response to receiving the command to unlock the door, the electromechanical locking assembly to place the electromechanical locking assembly into an unlocked position.

2. An integrated wireless door lock and camera apparatus, comprising:
   a camera for providing video or still images of an area in proximity to a door of a residence;
   a transducer for receiving acoustic, shock or vibration signals and for converting the acoustic, shock or vibration signals into electronic signals;
   a electromechanical locking assembly for unlocking the door;
   a receiver for receiving wireless signals to unlock the electromechanical locking assembly;
   a memory for storing processor-executable instructions;
   a transmitter for transmitting the video or still images to a Wi-Fi network; and
   a processor, coupled to the camera, the transducer, the electromechanical locking assembly, the memory and the transmitter for executing the processor-executable instructions that causes the apparatus to:
      store, by the processor, a representative audible doorbell chime in the memory while in a learn mode of operation;
      receive, by the processor via the transducer, the electronic signals;
      compare, by the processor, the electronic signals to the representative audible doorbell chime stored in the memory;
      determine, by the processor, that the electronic signals are indicative of a person outside of the door when the electronic signals match the representative audible doorbell chime stored in the memory;
      in response to determining that the electronic signals are indicative of a person outside of the door, activate, by the processor, the camera;
      transmit, by the processor via the transmitter, the video or one or more of the still images to the Wi-Fi network;
      receive, by the processor via the receiver in response to transmitting the video or one or more of the still images, a command to unlock the door; and
      activate, by the processor in response to receiving the command to unlock the door, the electromechanical locking assembly to place the electromechanical locking assembly into an unlocked position.

3. The apparatus of claim 2, wherein the transducer comprises a shock sensor, wherein the instructions that cause the processor to determine that the electronic signals represent a person outside of the door comprise instructions that cause the apparatus to:
   receive, by the shock sensor, a shock wave from the door and convert the shock wave into the electronic signals;
   determine, by the processor, that the electronic signals represent a person knocking on the door; and
   activate, by the processor, the camera when the electronic signals represent a person knocking on the door.

4. The apparatus of claim 2, wherein the transducer comprises a microphone, wherein the instructions that cause the processor to determine that the electronic signals represent a person outside of the door comprise instructions that cause the apparatus to:
   receive, by the microphone, an acoustic signal and convert the acoustic signal into the electronic signals;
   determine, by the processor, that the electronic signals represent a sound of a person knocking on the door; and
   activate, by the processor, the camera when the electronic signals represent a person knocking on the door.

5. A method performed by an integrated wireless door lock and camera apparatus, comprising:
   entering, by a processor, into a learn mode of operation;

receiving, by a transducer coupled to the processor, a physical disturbance and converting the physical disturbance into an electronic input signal;

storing, by the processor, the electronic input signal in the memory;

exiting the learn mode of operation;

receiving, by a transducer, a second physical disturbance and converting the second physical disturbance into a second electronic input signal;

comparing, by the processor, the second electronic signal to the electronic signal stored in memory;

determining, by the processor, that the second electronic input signal is indicative of a person in proximity to the apparatus when the second electronic signal matches the electronic signal stored in the memory;

in response to determining that the second electronic input signal is indicative of a person in proximity to the apparatus, activating, by the processor, a camera coupled to the processor to generate a video or one or more still images;

transmitting, by the processor via a transmitter coupled to the processor, the video or one or more of the still images to a local-area network;

receiving, by the processor, in response to transmitting the video or one or more of the still images, a command to unlock an electromechanical locking assembly coupled to the processor; and activating, by the processor, the electromechanical locking assembly to unlock the door in response to receiving the command.

6. The method of claim 5, wherein the physical disturbance comprises an audible doorbell chime as a result of a doorbell being activated, wherein the method for determining that the second electronic input signal is indicative of a person in proximity to the apparatus comprises:

determining, by the processor, that the second electronic input signal is indicative of the audible doorbell chime.

7. The method of claim 5, wherein the physical disturbance comprises a mechanical shock received by the transducer as a result of a person knocking on the door.

8. The method of claim 5, wherein the physical disturbance comprises a presence of infra-red energy.

9. A method performed by an integrated wireless door lock and camera apparatus mounted to a door of a residence, comprising:

entering, by a processor, into a learn mode of operation;

receiving, by a wireless receiver coupled to the processor, an electronic input signal from an external device;

storing, by the processor, the electronic input signal in the memory;

exiting the learn mode of operation;

receiving, by the wireless receiver, a second electronic input signal from the external device;

comparing, by the processor, the second electronic signal to the electronic signal stored in memory;

determining, by the processor, that the second electronic input signal matches the electronic signal stored in the memory;

in response to determining that the second electronic input signal matches the electronic signal stored in the memory, activating, by the processor, a camera coupled to the processor to generate a video or one or more still images;

transmitting, by the processor via a transmitter coupled to the processor, the video or one or more of the still images to a Wi-Fi network;

receiving, by the processor via the wireless receiver, in response to transmitting the video or one or more of the still images, a command to unlock an electromechanical locking assembly coupled to the processor; and activating, by the processor, the electromechanical locking assembly to unlock the door in response to receiving the command.

10. The method of claim 9, wherein the electronic input signal and the second electronic input signal each comprise a doorbell activation signal generated by a wireless doorbell proximate to the door, wherein the doorbell activation signal activates a doorbell receiver inside the residence.

11. The method of claim 9, wherein the electronic input signal and the second electronic input signal each comprise a Wi-Fi signal from a wireless router inside the residence, the Wi-Fi signal transmitted by the wireless router in response to the wireless router receiving a signal from a networked user device.

12. The method of claim 11, wherein the networked user device comprises a wireless doorbell proximate to the door, and the signal comprises a doorbell activation signal transmitted by the wireless doorbell that activates a doorbell chime located inside the residence.

13. The apparatus of claim 1, wherein the camera activation signal comprises a doorbell activation signal generated by a wireless doorbell proximate to the door, wherein the doorbell activation signal activates a doorbell receiver inside the residence.

14. The apparatus of claim 1, wherein the local-area network comprises a Wi-Fi network inside the residence, and the camera activation signal is transmitted by the Wi-Fi network in response to receiving a signal from a wireless doorbell, and the signal comprises a doorbell activation signal transmitted by the wireless doorbell.

15. The apparatus of claim 1, further comprising a passive infra-red (PIR) sensor coupled to the processor, wherein the camera activation signal is received from the PIR sensor in response to the PIR sensor detecting the presence of a person in proximity to the door.

16. The apparatus of claim 2, further comprising:

a mechanical doorbell hard-wired to a doorbell receiving unit inside the residence, the doorbell receiving unit for generating an acoustic doorbell chime when the doorbell is pressed;

wherein the processor-executable instructions further cause the apparatus to:

convert, by the transducer, the doorbell chime into the electronic signals;

determine, by the processor, that the electronic signals represent the doorbell chime; and activate, by the processor, the camera when the electronic signals represent the doorbell chime.

\* \* \* \* \*